Figure 18:
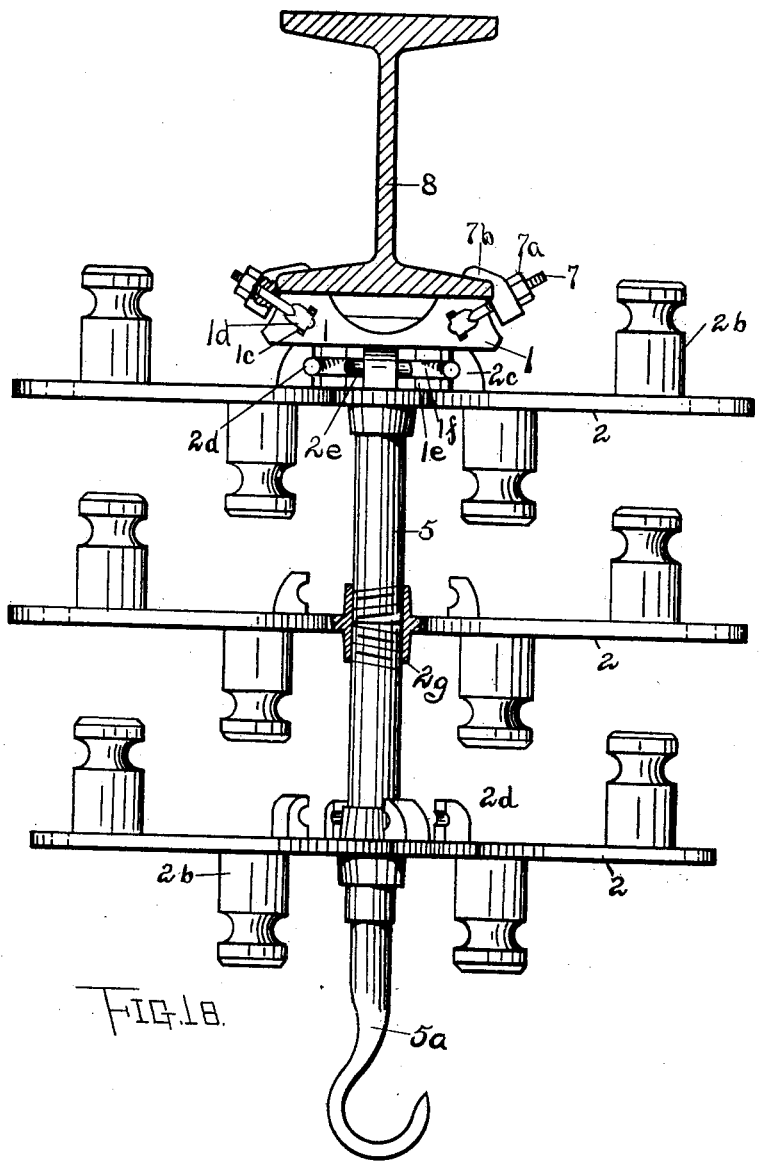

No. 706,786. Patented Aug. 12, 1902.
J. W. SEAMAN.
DEVICE FOR STRINGING ELECTRIC WIRES.
(Application filed Jan. 14, 1902.)
(No Model.) 8 Sheets—Sheet 1.
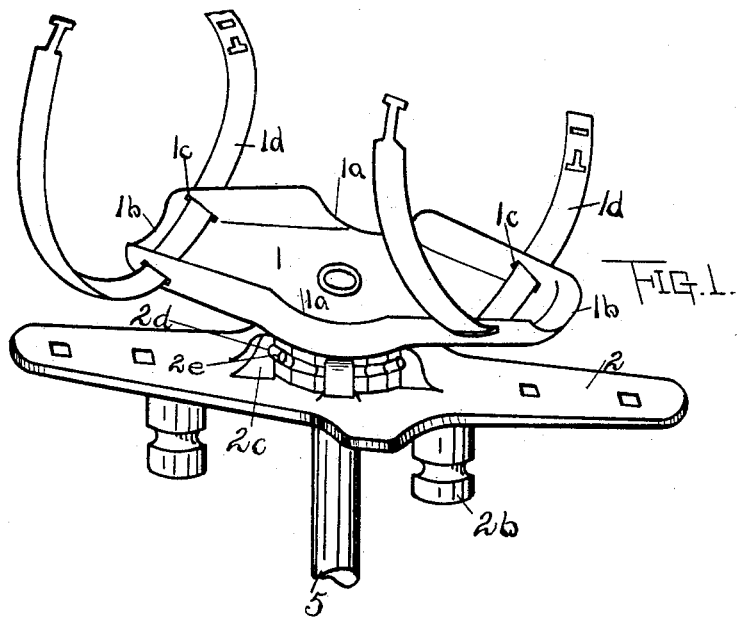
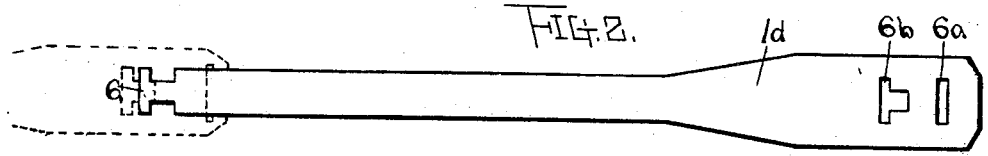
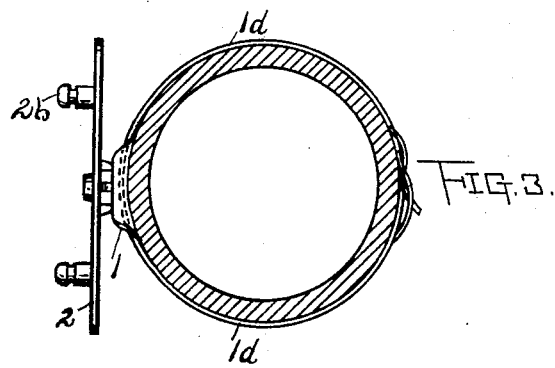
WITNESSES: INVENTOR
James C. Hanson. John W. Seaman
W. A. Stephens BY
Geo. B. Willcox ATTORNEY No. 706,786. Patented Aug. 12, 1902.
J. W. SEAMAN.
DEVICE FOR STRINGING ELECTRIC WIRES.
(Application filed Jan. 14, 1902.)
(No Model.) 8 Sheets—Sheet 2.
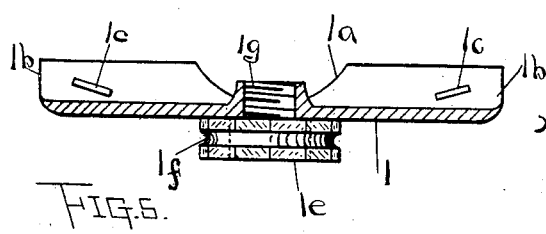
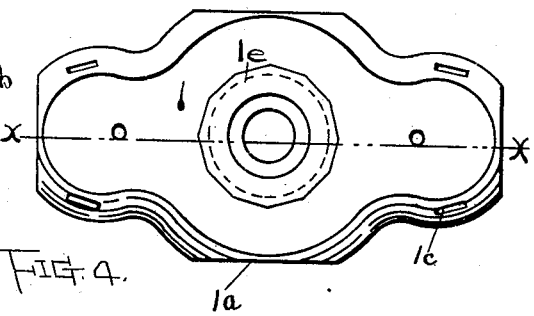
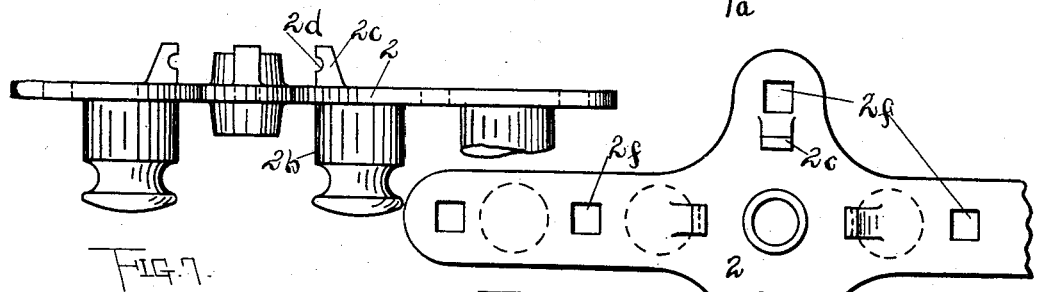
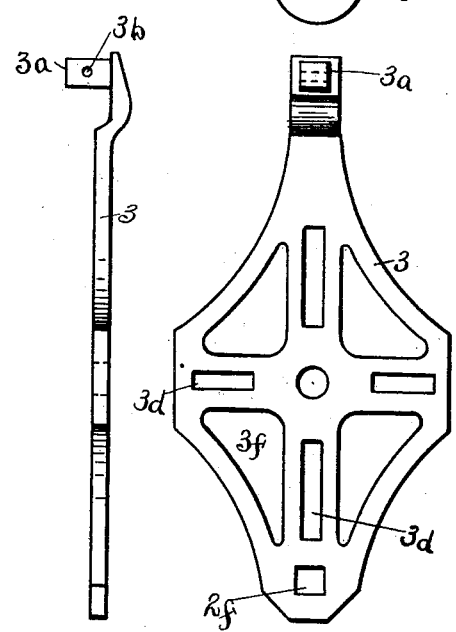
WITNESSES: INVENTOR
James C. Hanson John W. Seaman
W. A. Stephens BY
Geo. B. Willcox ATTORNEY No. 706,786. Patented Aug. 12, 1902.
J. W. SEAMAN.
DEVICE FOR STRINGING ELECTRIC WIRES.
(Application filed Jan. 14, 1902.)
(No Model.) 8 Sheets—Sheet 3.
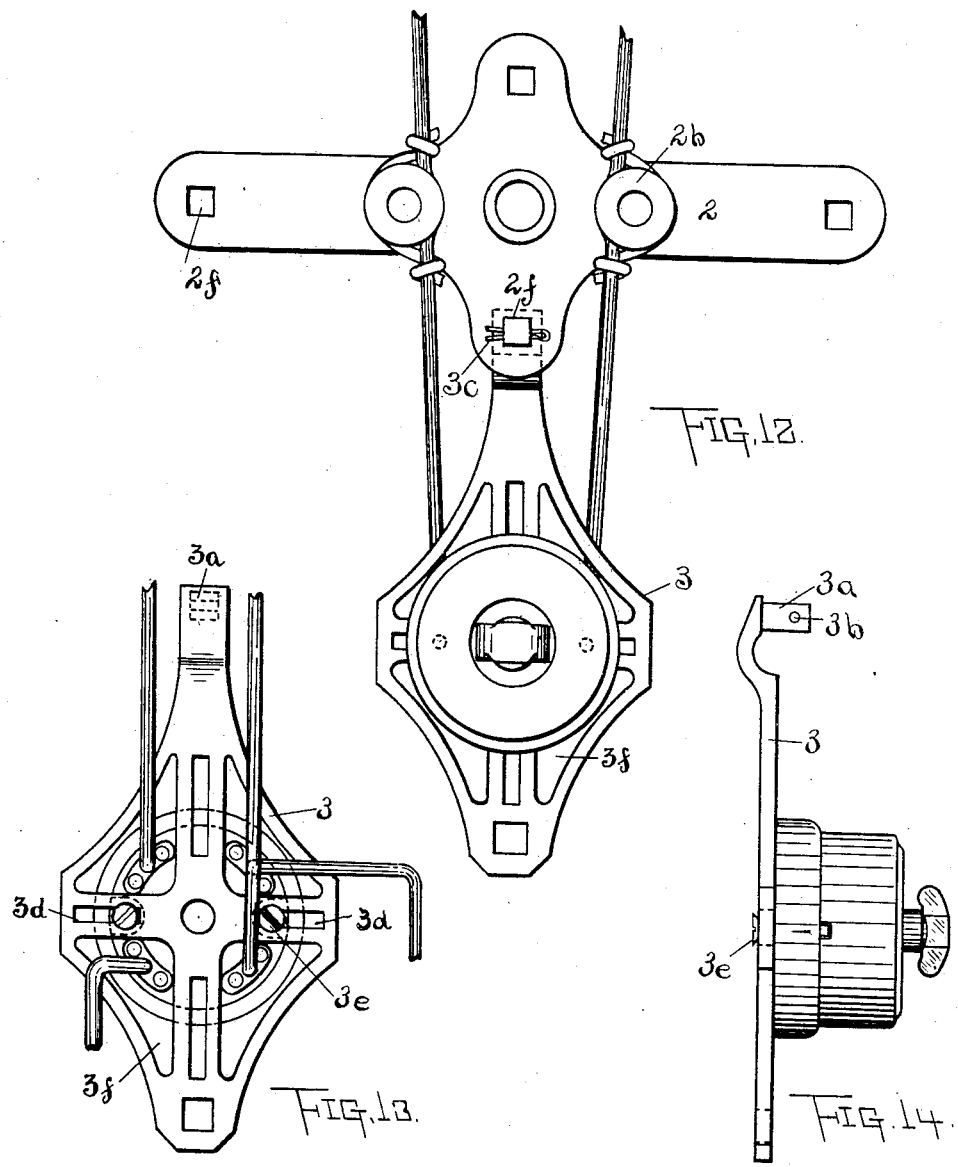
WITNESSES:
James C. Hanson
H. A. Stephens
INVENTOR
John W. Seaman
BY
Geo. B. Willcox ATTORNEY
THE NORRIS PETERS CO., PHOTO-LITHO., WASHINGTON, D. C.

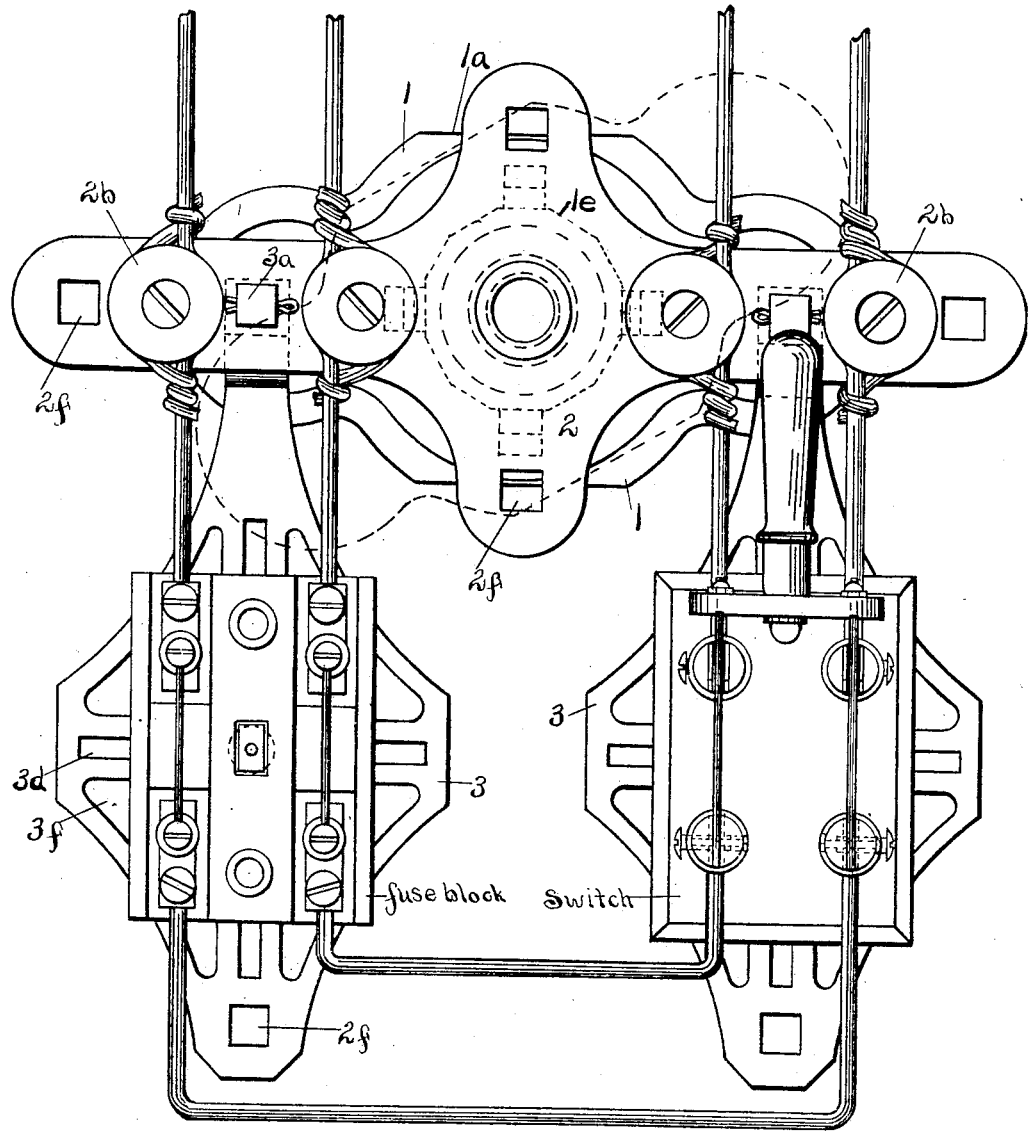

No. 706,786. Patented Aug. 12, 1902.
J. W. SEAMAN.
DEVICE FOR STRINGING ELECTRIC WIRES.
(Application filed Jan. 14, 1902.)
(No Model.) 8 Sheets—Sheet 5.
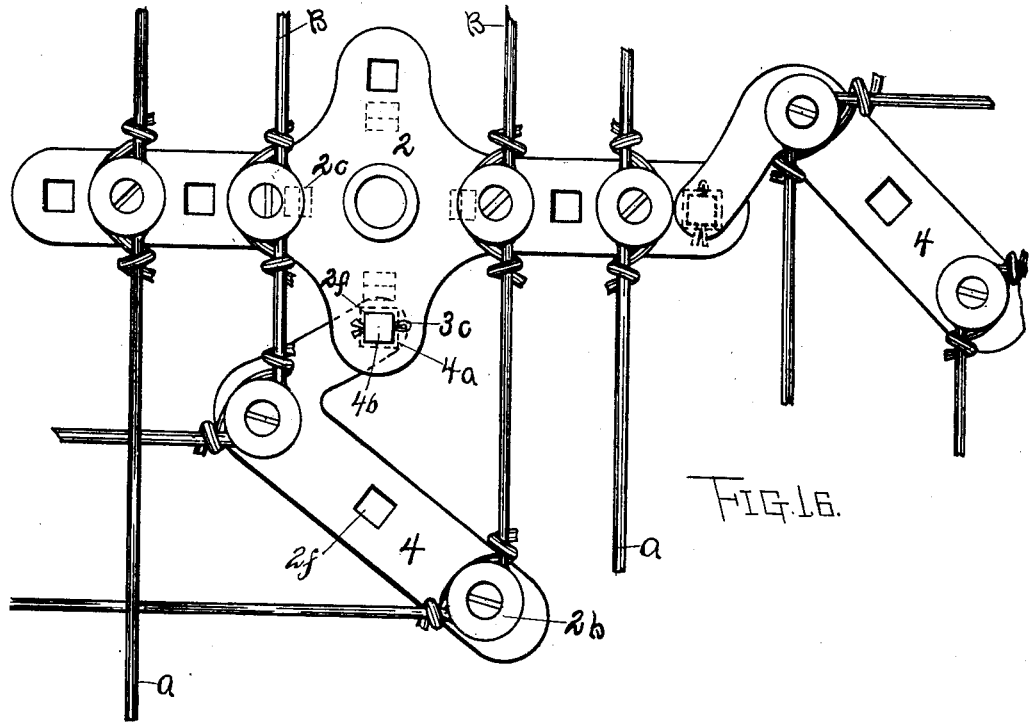
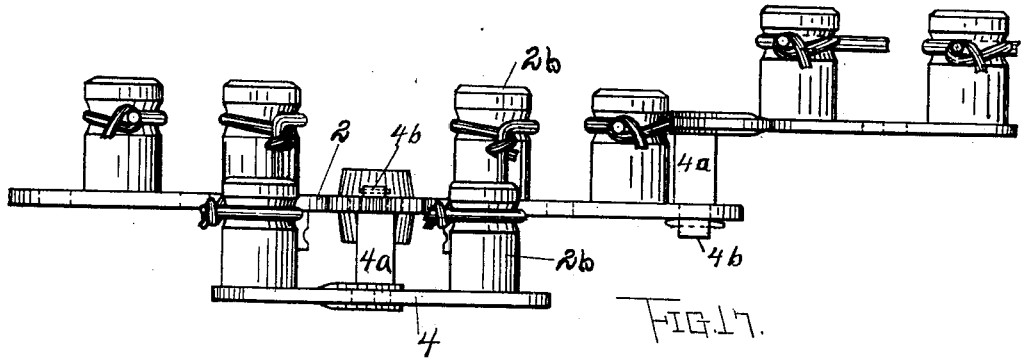
WITNESSES:
James C. Hanson
W. A. Stephens
John W. Seaman
INVENTOR
BY
Geo. B. Willcox, ATTORNEY
THE NORRIS PETERS CO., PHOTO-LITHO., WASHINGTON, D. C.

No. 706,786. Patented Aug. 12, 1902.
J. W. SEAMAN.
DEVICE FOR STRINGING ELECTRIC WIRES.
(Application filed Jan. 14, 1902.)
(No Model.)
8 Sheets—Sheet 6.

WITNESSES:
James C. Hanson
W. A. Stephens

INVENTOR
John W. Seaman
BY
Geo. B. Willcox ATTORNEY

No. 706,786. Patented Aug. 12, 1902.
J. W. SEAMAN.
DEVICE FOR STRINGING ELECTRIC WIRES.
(Application filed Jan. 14, 1902.)
(No Model.) 8 Sheets—Sheet 7.
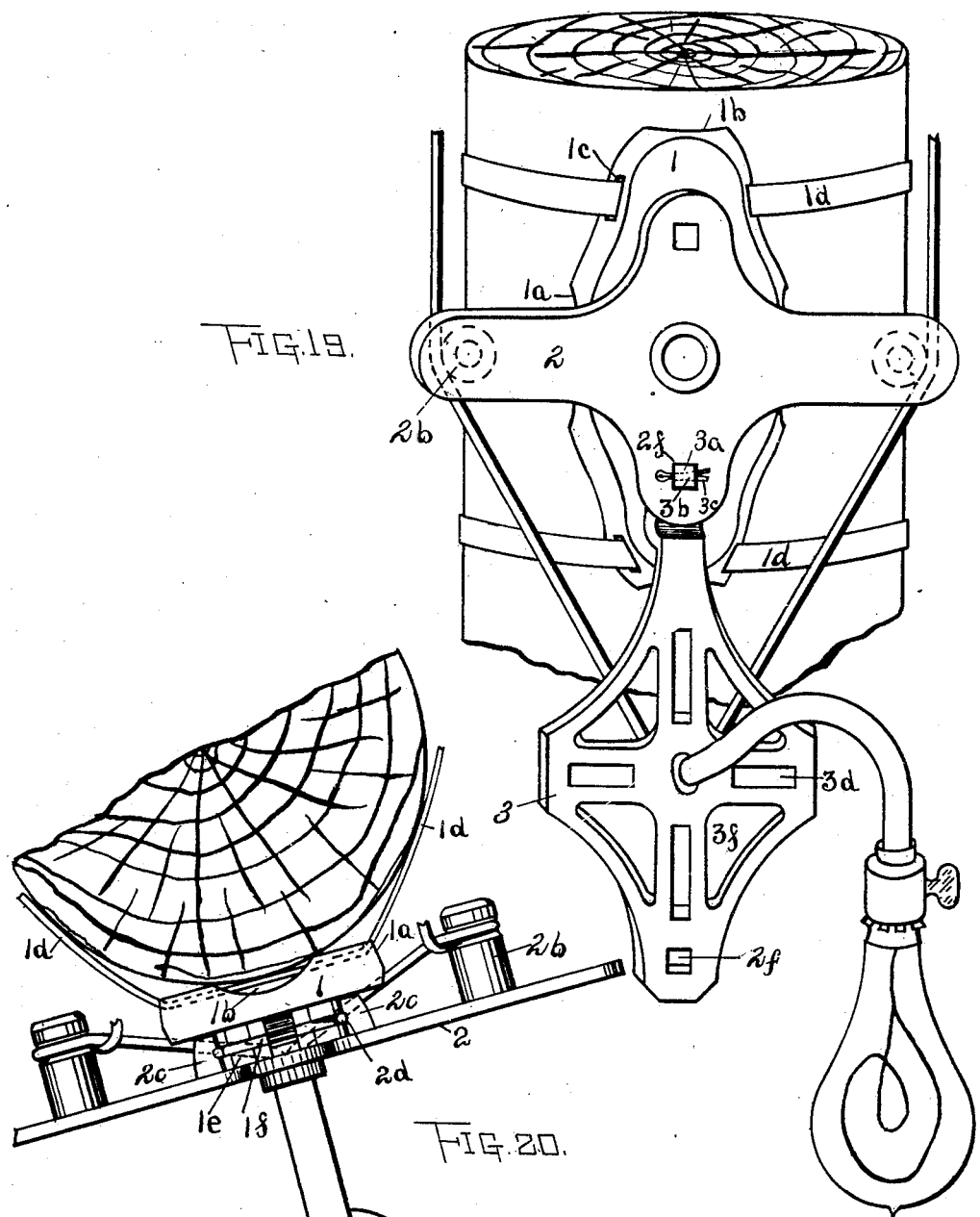
WITNESSES:
Jas. C. Hanson
M. Stephens
INVENTOR
John W. Seaman
BY
Geo. B. Willcox ATTORNEY No. 706,786. Patented Aug. 12, 1902.
J. W. SEAMAN.
DEVICE FOR STRINGING ELECTRIC WIRES.
(Application filed Jan. 14, 1902.)
(No Model.) 8 Sheets—Sheet 8.

WITNESSES:
W. A. Stephens
James C. Hanson

John W. Seaman
INVENTOR

BY
Geo. B. Willcox ATTORNEY

THE NORRIS PETERS CO., PHOTO-LITHO., WASHINGTON, D. C.

UNITED STATES PATENT OFFICE.

JOHN W. SEAMAN, OF BAY CITY, MICHIGAN.

DEVICE FOR STRINGING ELECTRIC WIRES.

SPECIFICATION forming part of Letters Patent No. 706,786, dated August 12, 1902.

Application filed January 14, 1902. Serial No. 89,725. (No model.)

*To all whom it may concern:*

Be it known that I, JOHN W. SEAMAN, a citizen of the United States, residing at Bay City, in the county of Bay and State of Michigan, have invented certain new and useful Improvements in Devices for Stringing Electric Wires; and I do hereby declare the following to be a full, clear, and exact description of the invention, such as will enable others skilled in the art to which it appertains to make and use the same.

This invention is a device for stringing electric wires; and the improvements consist in certain constructions and combinations of parts whereby I attain the objects of my invention. These objects are, first, to provide a base which can be easily and quickly secured either to the webs or flanges of steel beams, to the sides of pillars, or to the masonry or wooden framework of a building in which the wiring is to be done.

Another object is to provide the base with a cap so constructed that it can be set at any angle relatively to the base, permitting the wires to be strung in any desired direction without altering the position of the base.

A further object is to provide, in combination with the cap, certain auxiliary devices whereby fuse-blocks, switches, wall-brackets, and other apparatus used in electrical work can be supported without being fastened direct to the framework of the building.

Another object is to provide means by which wires may be led not only parallel to each other in straight leads, but may also, if desired, be turned at an angle and offset so as to clear other wires on the same cap.

A still further object is to provide means for supporting several insulator-carrying caps from a single base, so that many lines of wire arranged in sets one above the other may be supported from a single base.

These and certain other objects and advantages will be more fully set forth in the following specification and illustrated in the accompanying drawings.

Figure 21:
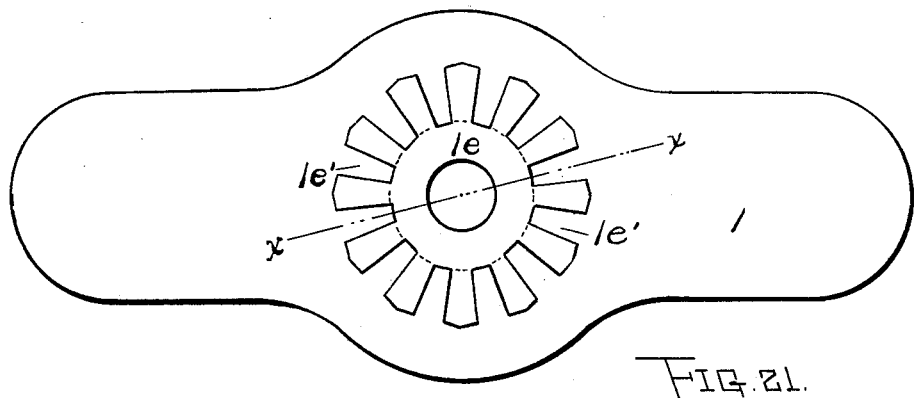
Figure 22:
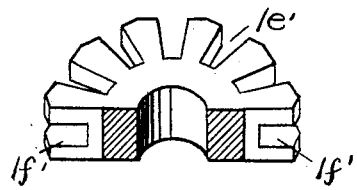
Figure 23:
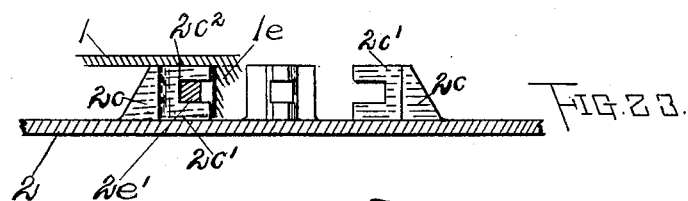
Figures 24, 25:
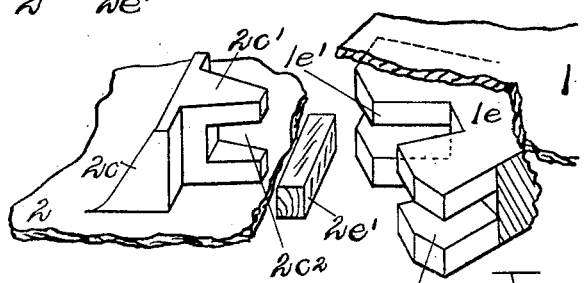

In the drawings, Figure 1 is a perspective view of the device arranged for suspending wires from an overhead beam. Fig. 2 is a detail of a strap for securing the base to the beam. Fig. 3 is a transverse section of a pipe, showing the manner of fastening the base to the pipe by straps. Fig. 4 is a bottom view of the base. Fig. 5 is a part-sectional view of the base, taken on the line $x\,x$ of Fig. 4. Fig. 6 is a top view of the cap, broken away in parts. Fig. 7 is a side elevation of the same, partly broken away. Figs. 8 and 9 are respectively a side elevation and plan view of the switch-supporting bracket. Figs. 10 and 11 are respectively a top view and side view of the bracket by which one set of wires is offset from other wires strung on the same cap. Fig. 12 shows the switch-supporting bracket attached to the cap. Fig. 13 is a rear elevation of the switch-supporting bracket with the switch attached. Fig. 14 is a side view of the switch and bracket shown in Fig. 12. Fig. 15 is a front view of the device carrying two switch-brackets, showing a switch and fuse-block, together with their wires, supported from a single cap. Fig. 16 is a plan view of a cap carrying a straight circuit or lead composed of two wires, and a corner lead, the wires of which are offset to avoid those of the first lead, together with an additional bracket carrying a corner lead. Fig. 17 is a side elevation of the parts shown in Fig. 16. Fig. 18 is a side elevation showing a base secured to an I-beam and a number of caps suspended therefrom. Fig. 19 shows a base, cap, and bracket secured to a cylindrical pillar and carrying a wall-bracket for an incandescent lamp. Fig. 20 is a top view of the same, broken away in parts. Fig. 21 is a bottom view of the base, showing a modified form of the polygonal boss. Fig. 22 is a sectional view of the boss in perspective, taken on the line $x\,x$ of Fig. 21. Fig. 23 is a part-sectional view of the cap, showing a modified form of lug and illustrating the manner of locking the cap to the base. Fig. 24 is a perspective detail of a single lug. Fig. 25 is a partial perspective detail of the boss.

As is clearly shown in the drawings, the device consists in the base 1, which is adapted to be attached with equal facility to the flange or web of a steel beam or to a wooden or brick wall or other part of the structure in which the wiring is to be done, and a cap 2, which supports the insulating-knobs, having means for attachment to the base. The cap may be fixed at any angle relatively to the base, thereby permitting the wires to be run in any desired direction without changing the base from its original position on the beam. The base 1 is preferably stamped from sheet metal or cast-iron or other suitable material. It may be made in various forms other than that shown in the drawings; but I prefer to construct it as shown, having somewhat the appearance of an elongated hollow dish. The upwardly-extending sides of the base are cut away at the sides and ends to form curved recesses $1^a$ and $1^b$. These recesses permit the base to be attached either transversely or longitudinally to the curved surface of a pipe or cylindrical column, as shown in Fig. 19, affording the base a firm bearing and preventing it from rocking. Through the sides of the base I provide slots $1^c$ to receive metal straps $1^d$, by which the base is secured to the beam or column. When the base is applied to the pipe transversely—that is, at right angles to the position shown in Fig. 19—the straps $1^d$ may be crossed diagonally at the back of the pipe and fastened together, or the base may be secured to the pipe by screws or other suitable means. The base has a downwardly-projecting polygonal boss or nut $1^e$, having a circumferential groove $1^f$.

The adjustable cap 2 carries the insulators $2^b$ and is fixed to the polygonal boss of the base by means of oppositely-placed lugs $2^c$, the inner faces of which engage the flat faces of the boss. The inner face of each lug is provided with a groove $2^d$, which registers with the groove $1^f$ of the boss when the cap is in place. The cap is locked to the boss by means of a locking key or pin $2^e$, driven into the groove between the boss and lug.

In the modified form shown in Figs. 21 to 25, inclusive, the boss $1^e$ is provided with radial slits $1^{e'}$, into which a tongue $2^{c'}$ of the lugs $2^c$ fits. The circumferential groove around the polygonal boss is in this case made deeper, as at $1^{f'}$ in Figs. 22 and 25. The tongue $2^{c'}$ has a corresponding transverse slit $2^{c2}$, registering with the groove $1^{f'}$ of the boss. The slit $2^{c2}$ extends from the point of the tongue $2^{c'}$ back a sufficient distance to permit of inserting the locking-pin $2^{e'}$ when the lug is in engagement with the boss. The object of this construction is to positively engage the pin $2^{e'}$ between the boss and the lugs, as shown in Fig. 23, so that neither the boss nor the lugs can be moved out of position without first removing the pin and greater rigidity of the joint is secured.

The cap is quickly applied to the under side of the base in any desired angular position and locked in place. When the cap is in place, the wires may be strung upon the insulators as in ordinary wiring. The use of the base and cap just described renders it unnecessary to determine accurately beforehand the location of each pair of insulators and to decide definitely upon the direction which the wires must take, as is the case when the insulators are secured to immovable blocks attached to the frame of the building.

In order to support fuse-blocks, switches, wall-brackets, and similar apparatus used in electric work from the cap instead of fastening them to the frame of the building, I provide a switch-supporting bracket 3, (illustrated in Figs. 8 and 9,) provided at one end with an upward projection $3^a$, which fits in corresponding openings $2^f$ in the cap 2. The projection $3^a$ has a transverse hole $3^b$ to receive a cotter $3^c$, which locks the bracket to the cap 2. A number of openings $2^f$ are provided in the cap, so that the position of the bracket 3 can be varied to suit requirements, and when desired more than one bracket can be secured to the cap, as shown in Fig. 15. Radiating slots $3^d$ are arranged to receive the clamping-screws $3^e$ of the various forms of standard switches, fuse-blocks, and similar appliances. Other openings $3^f$ in the bracket 3 are provided for convenience in wiring the switches, &c., as shown in Fig. 13.

It frequently happens in electric wiring that several sets of wires have to be supported from a single cap. Such a case is illustrated in Figs. 16 and 17, in which $a\ a$ is a straight parallel lead, and B B is a lead extending parallel to the first until it reaches the cap and then making a right-angle turn. The wires A and B would interfere unless offset. To properly offset the wires, I provide a bracket 4. (Shown in detail in Figs. 10 and 11.) This bracket has an upwardly-extending projection $4^a$, the reduced upper end of which fits the openings $2^f$ of the cap 2 and carries one or more insulators. By means of this bracket 4 the wires B can be offset either above or below the wires A, according as the bracket is fastened to the top or bottom of the cap. In practice I make the projection $3^a$ of the bracket 3 the same size as the reduced end $4^b$ of the projection $4^a$, so that the brackets 3 and 4 are interchangeable. I also provide openings $2^f$ in the bracket 4, so that additional brackets can be suspended from bracket 4 when the conditions or convenience of wiring make it advisable.

Where many wires have to be supported from a single base, as shown in Fig. 18, I provide extension-bars 5, having threaded ends to screw into the threaded opening $1^g$ of the base 1 or the opening $2^g$ of the cap 2. The lower member may be formed with a hook $5^a$, from which an arc-lamp may be suspended.

I prefer to fasten the base 1 to the beams or framework of the building by means of metal straps $1^d$, passing through the slots $1^c$. The ends of the straps $1^d$ can be bent over the flange of a steel beam and clenched. If the strap passes around a cylindrical column, as indicated in Fig. 3, its ends may be interlocked by the means shown in Fig. 2, in which 6 is the T-shaped end of the strap, and $6^a$ is a slot in the opposite end to receive it.

$6^b$ is a T-shaped slot, through the large end of which the part 6 passes. The two ends of the strap are firmly locked together when the stem of the end 6 engages the stem of the slot $6^b$.

Two or more straps may thus be locked together to form a single strap when one of extra length is required, as is indicated by the dotted lines in Fig. 2. For heavier work I provide threaded ends 7 for the straps 1$^d$, having nuts 7$^a$ for clamping hooked washers 7$^b$ over the flange of the beam 8, as shown in Fig. 18.

By means of the devices above described I have completed a system of interchangeable parts which meet the requirements of all systems of wiring and do away with the necessity of having a carpenter accompany the lineman to fit wooden blocks to the steelwork or masonry of a building as the wiring progresses. By means of my improved system the lineman is enabled to easily and quickly attach the bases to the framing of the building along the proposed line of wiring, and after the bases are in place he can attach the caps at any required angle, after which the wires can be strung with the least amount of labor.

What I claim as my invention, and desire to secure by Letters Patent, is—

1. In a device for stringing electric wires, the combination of a base adapted to be attached to the framework of a building, and a detachable insulator-carrying cap secured to said base by means whereby said cap can be secured at various angles relatively to the base, for the purposes set forth.

2. The combination of a base having a circumferentially-grooved polygonal boss secured thereto; an insulator-carrying cap having oppositely-placed lugs with grooves to register with the groove of the polygonal boss, and pins fitting said grooves for locking the lugs to the boss, substantially as described.

3. In a device for stringing electric wires the combination of a base; a polygonal boss secured to said base; radial slots in the faces of said boss; a circumferential groove intersecting said radial slots; together with a cap carrying oppositely-placed lugs; inwardly-projecting tongues integral with said lugs and adapted to engage the radial slots of the boss; a transverse slit in each tongue; and a pin adapted to interlock said lugs and boss.

4. In combination with a base and an angularly-adjustable cap; a detachable switch-carrying bracket; comprising a flat frame having radial slots, and openings intermediate said slots; together with an upwardly-extending projection on said bracket adapted to engage a hole in said cap, substantially as described.

5. In a device for stringing electric wires the combination with a base and an angularly-adjustable cap removably secured thereto; of a detachable insulator-carrying bracket removably secured to said cap, the plane of said bracket being offset from the plane of the cap, for the purposes set forth.

6. In a device of the kind described, a base having upwardly-extended sides provided with slits near their ends; of metal straps passing through the slits, each of said straps having one end T-shaped and having at the other end a straight slit and a T-shaped slit whereby the ends of said straps can be locked together, for the purposes set forth.

7. In a device for stringing electric wires, the combination of a base adapted to be secured to the frame of a building; an angularly-adjustable insulator-carrying cap removably secured to said base; a threaded opening through said cap; and extension-bars having threaded ends to engage said openings, whereby a plurality of caps may be supported from a single base.

8. The combination of a base having upwardly-extending sides provided with curved recesses and having slits near their ends; metal straps passing through the slits, each strap being T-shaped at one end and having at the other end a straight slit and a T-shaped slit; a circumferentially-grooved polygonal boss secured to the face of said base; an insulator-carrying cap having oppositely-placed lugs with grooves to register with the groove of the polygonal boss; a pin fitting said grooves for locking the lug to the boss; a central threaded opening in the cap; extension-bars having threaded ends to engage said threaded openings; a switch-supporting bracket having a projection; an opening in the cap to receive said projection; radial slots in said bracket; and an L-shaped offset-bracket having an upwardly-extending projection to fit the opening in the cap, all arranged substantially as described and for the purposes set forth.

In testimony whereof I affix my signature in presence of two witnesses.

JOHN W. SEAMAN.

Witnesses:
JAMES C. HANSON,
I. GOULD.